United States Patent
Mathews et al.

(10) Patent No.: US 9,642,383 B2
(45) Date of Patent: May 9, 2017

(54) FOOD PRODUCT INCLUDING FULLY OR PARTIALLY COOKED EGG

(71) Applicant: Michael Foods, Inc., Minnetonka, MN (US)

(72) Inventors: Jason W. Mathews, Gaylord, MN (US); Wanda P. Paine, Gaylord, MN (US)

(73) Assignee: Michael Foods, Inc., Minnetonka, MN (US)

( * ) Notice: Subject to any disclaimer, the term of this patent is extended or adjusted under 35 U.S.C. 154(b) by 61 days.

(21) Appl. No.: 13/839,852

(22) Filed: Mar. 15, 2013

(65) Prior Publication Data

US 2014/0272038 A1   Sep. 18, 2014

(51) Int. Cl.
*A23L 1/32* (2006.01)
*A23L 1/00* (2006.01)
*A23P 20/10* (2016.01)
*A23P 20/20* (2016.01)
*A23L 15/00* (2016.01)

(52) U.S. Cl.
CPC .............. *A23L 1/32* (2013.01); *A23L 15/00* (2016.08); *A23P 20/10* (2016.08); *A23P 20/20* (2016.08); *A23V 2002/00* (2013.01)

(58) Field of Classification Search
CPC ...... A21C 9/06; A21C 9/066; A21D 13/0025; A23L 1/32
USPC ............................ 426/94, 275, 552, 614, 302
See application file for complete search history.

(56) References Cited

U.S. PATENT DOCUMENTS

| | | | |
|---|---|---|---|
| 6,068,864 A * | 5/2000 | Barrett et al. | 426/20 |
| 6,627,241 B1 * | 9/2003 | DeMars et al. | 426/512 |
| 2006/0121160 A1 * | 6/2006 | Preppernau et al. | 426/94 |
| 2006/0172059 A1 * | 8/2006 | Takeuchi | A23L 1/224 426/660 |
| 2009/0246334 A1 * | 10/2009 | Efstathiou et al. | 426/300 |

* cited by examiner

*Primary Examiner* — Jill Warden
*Assistant Examiner* — Bhaskar Mukhopadhyay
(74) *Attorney, Agent, or Firm* — Zollinger & Burleson Ltd.

(57) ABSTRACT

A food product involving an integral combination of an egg layer and an edible, grain-based solid substrate can be provided by a method that involves providing a precursor product which then is heated to provide the food product. The precursor product can be provided by introducing an egg mixture to a primary surface of the edible solid substrate. The heating of the precursor converts the egg mixture into the at least partially cooked egg layer of the food product.

17 Claims, 1 Drawing Sheet

FOOD PRODUCT INCLUDING FULLY OR PARTIALLY COOKED EGG

BACKGROUND INFORMATION

Large portions of society continue to experience an increase in the pace of daily life. That quickened pace has been accompanied by increases in the appreciation of and demand for convenience, particularly in connection with food.

The importance of convenience can be seen in the growth in fast food restaurants, made-to-order vendors, and ready-to-eat frozen and refrigerated foods. These trends have been particularly pronounced in connection with food items commonly associated with breakfast, many of which include some type of cooked egg product.

Interest in and demand for protein-rich foods also continues to grow and, at least in connection with egg-origin protein, this intersects with the increased demand for convenience discussed above.

Probably in response to these trends, multitudes of bread-egg combinations have been made available. In these, whole eggs and egg components (e.g., egg white only) have been prepared in a variety of forms including fried, scrambled, Benedict, omelet, etc., while bread products have included muffins, bagels, toasted or untoasted bread, rolls, tortillas, etc.

In addition to made-to-order products using fresh ingredients, vendors have become comfortable with offering sandwich-like constructions that are wholly or partially made elsewhere. For example, a fast food restaurateur might purchase a pre-made egg-based sandwich and merely heat it prior to serving or, more commonly, fully heat a partially cooked egg product for assembly with a bread product. In the home, made-to-order and ready-to-heat products are most common, with the middle ground option (partially cooked, ready-to-assemble) being less common.

Bread-egg combinations are not without drawbacks, of course. For example, where the egg component of the combination is in a Benedict-type form, it can fall out from between the top and bottom bread components. Also, because of the nature of a sandwich construction, the ratio of protein-to-carbohydrate can be relatively low.

A sandwich-type construction that increases the protein-to-carbohydrate ratio and eliminates the possibility of spills while, at the same time, maintains the advantages of quick preparation and ease of handling has significant commercial value.

SUMMARY

Hereinafter is described a method of making a food product that is easy to handle, can be prepared quickly and easily, and has a higher-than-usual ratio of protein-to-carbohydrate.

The resulting food product can be analogized to an open-faced egg sandwich with one important proviso, specifically, the egg-based component of the sandwich is integral with the bread component, which eliminates the possibility that the two components can become separated, e.g., the egg-based component does not fall off or out of the bread-based component.

The food product involves an integral combination of an egg layer that is at least partially cooked with an edible, grain-based solid substrate. This food product can be provided by a method that involves providing a precursor product which then is heated to provide the food product.

The precursor product can be provided by introducing an egg mixture to a primary surface of the edible solid substrate. The heating of the precursor converts the egg mixture into the at least partially cooked egg layer of the food product.

The egg mixture can be introduced to the primary surface of the edible solid substrate in at least two different ways. One such way involves depositing the egg mixture directly on the primary surface of the edible, grain-based solid substrate. Another way involves depositing the egg mixture into or onto a carrier, followed by applying a primary surface of the edible solid substrate to the upper surface of the deposited egg mixture.

The heating step of the process can involve baking, broiling, microwaving, steaming, hot air, combinations (e.g., any of a variety of TurboChef™ ovens from TurboChef Technologies, Inc., of Carrollton, Tex.), and the like.

The resulting food product can be refrigerated or frozen for later use, either by an end consumer or by a vendor.

The food product, when ready for consumption (either immediately or after reheating), is both easy to handle and convenient.

It also provides flexibility in sizing. The food product can be less caloric than the heretofore standard breakfast sandwich because one of the two bread layers has been eliminated. However, because each food product includes an edible, grain-based solid substrate carrying an integrated egg layer, two (or more) food products can be combined to form something that looks akin to the standard breakfast sandwich, albeit with cooked egg layers that are integral with and partially integrated into the bread layers.

Other aspects will be apparent from the accompanying figures and the more detailed description that follows.

BRIEF DESCRIPTION OF THE DRAWINGS

Illustrative configurations set forth in the description that follows are shown in the drawings, where similar numbers refer to similar parts or features. The figures are not necessarily to scale.

DETAILED DESCRIPTION OF ILLUSTRATIVE EMBODIMENTS

The following description is provided to explain and exemplify the aforedescribed food product, particularly exemplary constructions and methods of making. The appended claims define the inventions in which exclusive rights are claimed, and they are not intended to be limited to particular embodiments shown and described.

Food product 10 involves an integral combination of an egg layer 14 that is at least partially cooked and an edible, grain-based solid substrate 12.

Essentially any type of cereal can be used as the grain from which edible substrate 12 is made, examples of which include, but are not limited to, wheat (all types), buckwheat, oats, barley, sorghum, millet, maize, rye, quinoa, and rice. Certain other plant origin materials, e.g., soybeans, can be used in the manufacture of bread-like products, and these also can be used.

Figure 1:
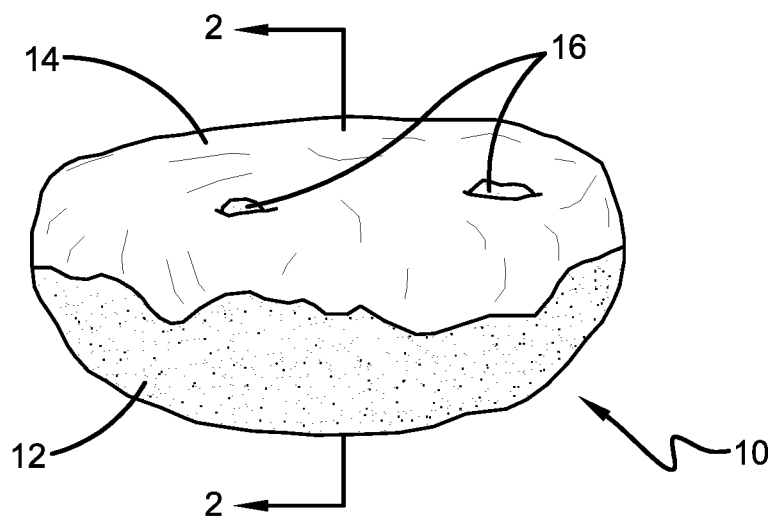
FIG. 1 is a side view of one embodiment of a food product according to the present invention.
Figure 2:
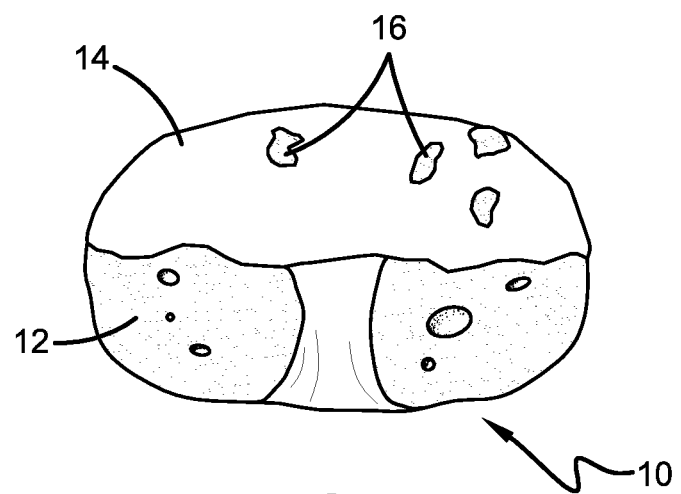
FIG. 2 is a sectional view taken along line 2-2 of FIG. 1.

The particular form of edible solid substrate 12 also is not limiting. In FIGS. 1 and 2, edible solid substrate 12 is depicted as a half of a bagel, but this is not limiting. Grains have been converted into multitudes of edible products; as long as any of these products is amenable to being held in the hand and can support and integrally connect with the egg layer (discussed below), they can be used in the food product of the present invention. Non-limiting examples include bread slices, bagels (sliced or unsliced), bagel thins, muffins, English muffins, croutons, crackers, rolls and baguettes (sliced or unsliced), flatbreads (including tortillas), cornbread, and the like.

The thickness of edible solid substrate 12 generally ranges from ~0.1 to ~1.0 inches, commonly from ~0.2 to ~0.8 inches, and typically from ~0.3 to ~0.7 inches. The weight of edible solid substrate can vary widely but generally ranges from ~0.5 to ~5 ounces, commonly from ~0.75 to ~3 ounces, and typically from ~1 to ~2.5 ounces.

If desired, edible solid substrate 12 can be toasted, browned, or otherwise heat treated prior to usage in the method described below.

Further, edible solid substrate 12 optionally can be soaked in, coated with or otherwise treated with any of a variety of spices such as salt, pepper, paprika, sesame seeds, granola, poppy seeds, coriander, cumin, curry powder, cinnamon, rosemary, and the like, any of a variety of oils and oil-based spreads such as margarine, butter or any of a variety of other types of dairy spreads, and any of a variety of glazes.

Egg layer 14 is at least partially cooked, meaning that it is cooked at a time/temperature combination that solidifies egg layer 14 sufficiently to permit it to adhere to and become integral with a primary surface of edible solid substrate 12. Typically, for a food product to be described as pre-cooked, it must have reached a certain minimum temperature, e.g., 165° F. More details on the heating are provided below in connection with the discussion of the food product precursor.

Egg layer 14 can be provided from a flowable egg-containing composition. This composition can be provided from whole eggs, egg whites, egg yolks, synthetic eggs, synthetic egg whites, synthetic yolks, or a combination of such ingredients.

Optionally but preferably, the flowable egg-containing composition also can contain any of a variety of solid taste and/or texture enhancers 16. These can include, but are not limited to, meats such as ham, bacon, sausage, steak, ground beef, poultry, pork, fish, and vegetarian versions of each, produce such as peppers, tomatoes, onions, carrots, parsley, pomes (including potatoes), corn, citrus fruits, and the like, and any of a variety of cheeses. These solid additives can be provided in whole form if sufficiently small but, in most case, will be provided in a parceled form such as diced, minced, shredded, cubed, cut, torn, mashed, julienned, and the like. In FIGS. 1 and 2, cheese and ground sausage are employed as solid taste and/or texture enhancers 16.

Other additives that can be included in the flowable egg-containing composition include, but are not limited to, any of a variety of spices (e.g., salt, pepper, paprika, coriander, cumin, curry powder, oregano, thyme, parsley, sage, rosemary, onion powder, etc.), preservatives such as BHT, citric acid, EDTA, nisin, texture modifiers including any of a variety of starches, gums (e.g., xanthan and guar), enzymes, emulsifiers, baking soda, baking powder, lecithin, various caseinates, glucono delta-lactone, various phosphates, and the like.

The flowable egg-containing composition can be pre-heated prior to introduction to edible solid substrate 12. This pre-heating can be accomplished by kettle heaters, convection, conduction, microwaving, tube heating, RF, induction, etc., and preferably results in a flowable egg-containing composition at a temperature of from ~90° to ~150° F.

For egg layer 14 to become integral with, or integrally connected with, edible solid substrate 12, the latter preferably has sufficient surface roughness to permit the flowable egg-containing composition to partially soak into the substrate prior to solidifying at elevated temperature. Some materials useful as substrates, like sliced bagels and English muffins, have substantial macroscopic roughness and, accordingly, are very amenable to receiving the flowable egg-containing composition in such a way so as to permit soaking and wicking of the flowable egg-containing composition beyond the very topmost layer of edible substrate 12. Other materials potentially useful as substrates, e.g., tortillas, appear much smoother but have significant microscopic texture, which often is sufficient to permit the flowable egg-containing composition to soak or wick into and become integral with the substrate.

The amount of flowable egg-containing composition to edible solid substrate 12 can vary widely but generally ranges from ~0.5 to ~6 ounces, commonly from ~0.75 to ~5 ounces, typically from ~1 to ~4 ounces, more typically from ~1.25 to ~3.5 ounces, and preferably from ~1.5 to ~3 ounces. The thickness of the flowable egg-containing composition generally ranges from ~0.1 to ~1 inches, commonly from ~0.2 to ~0.75 inches, and typically from ~0.3 to ~0.5 inches.

Introduction of the flowable egg-containing composition to edible solid substrate 12 results in provision of a precursor product which, upon heating, converts the flowable egg-containing composition into egg layer 14, resulting in food product 10.

The precursor product can be provided by introducing the flowable egg-containing composition to a primary surface of edible solid substrate 12. The introduction of these two components can be accomplished in at least two ways.

First, the flowable egg-containing composition can be applied to a primary surface of edible solid substrate 12. The application can be accomplished by any of a variety of techniques including, but not limited to, pouring, extruding, curtain coating, knife coating, and the like. Once the flowable egg-containing composition is applied, the precursor product then can be heated. Where this process is performed in a commercial setting, a plurality of edible solid substrates can be provided, optionally in an array, while being carried on a moving conveyance such as a belt. After flowable egg-containing composition is applied to the substrates, the one or more precursor products are conveyed to an oven or other heating unit. A precursor product can be inverted after application of the flowable egg-containing composition to the substrate, if desired; in such situations, preference can be given to those moving conveyances made from non-stick materials or treated so as to have low surface energy.

Second, the flowable egg-containing composition can be deposited onto a belt or into a mold prior to being covered, in whole or part, by a primary surface of edible solid substrate 12. Deposition of the flowable egg-containing composition can be accomplished by any of a variety of techniques including, but not limited to, pouring, extruding, curtain coating, and the like. Once the deposited flowable egg-containing composition is covered by edible solid substrate 12, the resulting precursor product then can be heated. Where this process is performed in a commercial setting, many molds can be filled and covered, and such molds optionally can be provided in an array. (If a belt is used, one or more essentially continuous columns of deposited flowable egg-containing composition can be applied to the belt.) The belt and/or molds can be conveyed, to an oven or other heating unit.

The precursor product is heated so as to convert flowable egg-containing composition to egg layer 14. The heating can be accomplished by convection, conduction, induction, microwaving, HTST, and preferably raises the temperature of egg layer 14 to at least ~100° F., more preferably to at least ~125° F., and most preferably to at least ~150° F. for a time of at least ~10 seconds. For certain applications, ensuring that egg layer 14 reaches a temperature of ~145° to ~165° F. for at least 20 seconds, at least 25 seconds, or at least 30 seconds can be desirable. For taste and texture reasons, the heating step preferably does not occur at an oven temperature of more than ~450° F., more preferably no more than 400° F., and is not performed for more than ~500 seconds, commonly no more than ~450 seconds, and typically no more than ~400 seconds.

Egg layer 14 can be partially or fully cooked. The term "partially cooked" means that egg layer 14 has become integral with edible solid substrate 12 but its internal temperature has not reached 165° F., while "fully cooked" means that the internal temperature of egg layer 14 has reached at least 165° F.

Upon heating, the precursor product is converted to food product 10 where egg layer 14 is integral and interconnected with the upper portion of a primary surface of edible solid substrate 12. This feature is best seen in FIG. 2, which is a cross-sectional view of food product 10 from FIG. 1. To remove egg layer 14 from the primary surface of edible solid substrate 12 often results in cohesive failure of a portion of the edible solid substrate 12 as opposed to an adhesive failure between egg layer 14 and edible solid substrate 12.

Any of a variety of flavor enhancers can be added to food product 10. These include, but are not limited to cheese, artificial cheese, spices, artificial flavor solids, any of a variety of crunchy toppings (e.g., bacon or bacon bits), and the like.

Food product 10 thus is provided in a convenient, easy-to-handle format. A consumer can be confident that egg layer 14 will not separate or detach from edible solid substrate 12. Further, food product 10 includes one fewer edible substrate layer than a typical breakfast sandwich, thereby reducing the amount of carbohydrates and increasing the protein-to-carbohydrate ratio ingested during consumption.

Unless food product 10 is to be consumed immediately after preparation, it can be introduced into packaging that permits both heating and cooling of its content. Preferably, food product 10 is cooled when cooking is complete. The amount of time necessary to cool a cooked food product varies based on weight but, typically, refrigerated temperatures (e.g., ~33° to ~40° F.) can be reached in ~10 to ~20 minutes, and freezer temperatures (e.g., 32° F. or below) can be reached in ~15 to ~30 minutes using, for example, a batch or spiral chilling methods.

Similarly, food product 10 typically is packaged after cooking. The nature of the cooling method(s) and the packaging employed typically is driven by the expected shelf life and storage temperatures. For example, some food products might be intended to be used in ~10 or fewer days, while others might be intended to be stored for up to several months. The former might be packaged using less costly materials and stored at ~33° to ~40° F., while the latter might employ more robust packaging and be stored at ~10° to as low as about −10° F.

In situations where food product 10 is not consumed immediately after preparation and, instead, cooled and packaged, reheating prior to consumption is contemplated. This can be accomplished in a number of ways including convection, conduction, induction, microwaving, hot air, etc., as long as the internal temperature of the egg layer reaches at least ~150°, commonly at least ~160°, and typically at least ~165° F.

The following table summarizes in list form the terms and phrases used to identify suitable parts and materials.

TABLE 1

| List of reference symbols | |
|---|---|
| Number | Description |
| 10 | food product |
| 12 | edible, grain-based solid substrate |
| 14 | egg layer |
| 16 | solid taste and/or texture enhancer |

The foregoing description has employed certain terms and phrases for the sake of brevity, clarity, and ease of understanding; no unnecessary limitations are to be implied therefrom because such terms are used for descriptive purposes and are intended to be broadly construed. The relevant portion(s) of any patent or publication specifically mentioned in the foregoing description is or are incorporated herein by reference.

The foregoing configurations and methods have been presented by way of example only. Certain features of the described configurations and methods may have been described in connection with only one or a few such configurations or methods, but they should be considered as being useful in other such configurations or methods unless their structure or use is incapable of adaptation for such additional use. Also contemplated are combinations of features described in isolation.

That which is claimed is:

1. A method of making a food product that comprises an at least partially cooked egg layer and an edible, grain-based solid substrate, said method comprising:
    a) pre-heating a flowable egg-containing composition to a temperature of from about 90° to about 150° F.,
    b) introducing said flowable egg-containing composition to a primary surface of said edible solid substrate so as to provide a food product precursor, and
    c) heating said food product precursor so as to convert said flowable egg-containing composition to said at least partially cooked egg layer, which is integrally connected with and bound to said substrate,
    thereby providing said food product.

2. The method of claim 1 wherein said flowable egg-containing composition is deposited on said primary surface of said edible solid substrate.

3. The method of claim 1 wherein said flowable egg-containing composition is deposited in or on a carrier followed by applying a primary surface of said edible solid substrate to the upper surface of said deposited flowable egg-containing composition.

4. The method of claim 1 wherein said flowable egg-containing composition comprises one or more solid additives.

5. The method of claim 1 wherein said primary surface of said edible solid substrate comprises macroscopic roughness.

6. The method of claim 5 wherein said edible solid substrate is a portion of a bagel.

7. The method of claim 5 wherein said edible solid substrate is a portion of an English muffin.

8. The method of claim 1 wherein said primary surface of said edible solid substrate comprises microscopic roughness.

9. The method of claim 8 wherein said edible solid substrate is a tortilla.

10. The method of claim 1 wherein said flowable egg-containing composition of said food product precursor soaks or wicks beyond the topmost layer of said primary surface of said edible solid substrate prior to said heating step.

11. The method of claim 1 further comprising packaging said food product and then cooling the resulting packaged food product.

12. The method of claim 1 wherein said heating step involves raising the internal temperature of said at least partially cooked egg layer to at least 165° F., thereby providing a fully cooked egg layer.

13. The method of claim 1 further comprising repeating steps (b) and (c) so as to provide a second food product and introducing said second food product to said food product so as to provide a sandwich construction.

14. The method of claim 2 wherein the deposition of said flowable egg-containing composition comprises pouring, extruding, curtain coating or knife coating of said composition onto said edible solid substrate.

15. The method of claim 1 wherein from about 1.5 to about 3 ounces of said flowable egg-containing composition is introduced to said edible solid substrate.

16. The method of claim 1 wherein the thickness of said flowable egg-containing composition of said food product precursor is from about 0.3 to about 0.5 inches.

17. The method of claim 1 wherein said pre-heating step employs a kettle heater, convection, conduction, microwaving, tube heating, RF or induction heating.

\* \* \* \* \*